(12) United States Patent
Wu et al.

(10) Patent No.: US 11,867,925 B2
(45) Date of Patent: Jan. 9, 2024

(54) DRIVING MECHANISM FOR OPTICAL ELEMENT

(71) Applicant: TDK TAIWAN CORP., Taoyuan (TW)

(72) Inventors: Fu-Yuan Wu, Taoyuan (TW);
Shang-Yu Hsu, Taoyuan (TW);
Yu-Huai Liao, Taoyuan (TW);
Meng-Ting Lin, Taoyuan (TW);
Guan-Bo Wang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 460 days.

(21) Appl. No.: 16/737,249

(22) Filed: Jan. 8, 2020

(65) Prior Publication Data
US 2021/0063763 A1 Mar. 4, 2021

Related U.S. Application Data

(60) Provisional application No. 62/894,295, filed on Aug. 30, 2019.

(30) Foreign Application Priority Data

Dec. 20, 2019 (EP) ..................................... 19218896

(51) Int. Cl.
*G02B 27/64* (2006.01)
*G02B 7/04* (2021.01)
(Continued)

(52) U.S. Cl.
CPC ............ *G02B 27/646* (2013.01); *G01B 11/24* (2013.01); *G01S 7/4813* (2013.01); *G01S 7/4816* (2013.01); *G01S 7/4817* (2013.01); *G01S 17/42* (2013.01); *G02B 7/005* (2013.01); *G02B 7/04* (2013.01); *G02B 7/1821* (2013.01); *G02B 26/0816* (2013.01); *G02B 26/101* (2013.01);

(Continued)

(58) Field of Classification Search
CPC .. G03B 5/00; G03B 13/36; G03B 2205/0007; G03B 2205/0053; G03B 2205/0069; G03B 3/02; G03B 3/10; G03B 5/04; G03B 30/00; G02B 7/021; G02B 7/08; G02B 7/09; G02B 7/10; G02B 9/62; G02B 13/001; G02B 13/0065; G02B 27/646; H04N 5/2253; H04N 5/2254; H04N 5/2257; H04N 5/23287; H02K 11/33; H02K 41/0356
USPC ....... 359/911, 554, 555, 557, 811, 813, 814, 359/824, 872, 877
See application file for complete search history.

(56) References Cited

U.S. PATENT DOCUMENTS

| | | | |
|---|---|---|---|
| 2012/0224841 A1* | 9/2012 | Wu ........................ | G03B 17/00 396/55 |
| 2017/0235095 A1* | 8/2017 | Sekimoto ............. | H04N 5/2254 359/824 |
| 2018/0332199 A1* | 11/2018 | Hu ........................... | G02B 7/08 |

* cited by examiner

*Primary Examiner* — Marin Pichler
(74) *Attorney, Agent, or Firm* — MUNCY, GEISSLER, OLDS & LOWE, P.C.

(57) ABSTRACT

A driving mechanism for an optical element is provided, including a support body, a movable portion, an elastic assembly, and a driving assembly. The movable portion is located in the support body. The movable portion is movable relative to the support body and is used to connect to an optical element. The elastic assembly is movably connected to the support body and the movable portion. The driving assembly is disposed on the support body and the movable portion, and is configured to drive the movable portion to move relative to the support body.

20 Claims, 6 Drawing Sheets

(51) Int. Cl.
  *G03B 5/06* (2021.01)
  *G03B 3/10* (2021.01)
  *H02K 41/035* (2006.01)
  *G03B 5/00* (2021.01)
  *G02B 7/182* (2021.01)
  *G02B 7/00* (2021.01)
  *G01B 11/24* (2006.01)
  *G01S 7/481* (2006.01)
  *G01S 17/42* (2006.01)
  *G02B 26/08* (2006.01)
  *G02B 26/10* (2006.01)
  *H02K 11/01* (2016.01)
  *G03B 13/36* (2021.01)
  *H02K 5/24* (2006.01)
  *G02B 7/18* (2021.01)
  *G03B 17/17* (2021.01)
  *G03B 5/04* (2021.01)
  *H04N 23/54* (2023.01)

(52) U.S. Cl.
  CPC ............ *G02B 26/105* (2013.01); *G03B 5/00* (2013.01); *G03B 5/06* (2013.01); *H02K 41/0356* (2013.01); *G02B 7/1805* (2013.01); *G03B 3/10* (2013.01); *G03B 5/04* (2013.01); *G03B 13/36* (2013.01); *G03B 17/17* (2013.01); *G03B 2205/0007* (2013.01); *G03B 2205/0046* (2013.01); *G03B 2205/0069* (2013.01); *H02K 5/24* (2013.01); *H02K 11/01* (2016.01); *H02K 2201/18* (2013.01); *H04N 23/54* (2023.01)

DRIVING MECHANISM FOR OPTICAL ELEMENT

CROSS REFERENCE TO RELATED APPLICATIONS

This application claims the benefit of U.S. Provisional Application No. 62/894,295, filed on Aug. 30, 2019, and European Patent Application No. 19218896.9, filed on Dec. 20, 2019, the entirety of which is incorporated by reference herein.

BACKGROUND OF THE INVENTION

Field of the Invention

The application relates in general to a driving mechanism for an optical element, and in particular to a driving mechanism for an optical element that includes an elastic assembly and a driving assembly.

Description of the Related Art

Thanks to ongoing technological developments, recent electronic devices (such as tablet computers and smartphones) usually include a lens module capable of aiding in photography or recording video, and some are even equipped with dual lens modules, bringing users a wealth of visual enjoyment. However, an image may come out blurry if the user shakes the lens module in the electronic device when using it. To improve image quality, it is increasingly important to design an effectively shockproof lens module. In addition, designers are currently pursuing the miniaturization of such devices, and it is expected that electronic products will be smaller and lighter with each successive generation. Therefore, how to design an optical mechanism with a better optical compensation function with a smaller volume through a special configuration is an important issue.

BRIEF SUMMARY OF INVENTION

To address the deficiencies of conventional products, an embodiment of the invention provides a driving mechanism for an optical element, including a support body, a movable portion, an elastic assembly, and a driving assembly. The movable portion is located in the support body and is movable relative to the support body, and is used to connect to an optical element. The elastic assembly is movably connected to the support body and the movable portion. The driving assembly is disposed on the support body and the movable portion, and is configured to drive the movable portion to move relative to the support body.

In some embodiments, the movable portion is suspended in the support body through the elastic element, and when the movable portion is driven by the driving assembly to move relative to the support body, the movable portion is configured to drive the optical element to move. The support body includes a base and a casing, the casing is connected to and disposed on the base, the elastic assembly movably connects the casing and the movable portion, and the driving assembly is disposed between the base and the movable portion, and the movable portion is suspended from the casing through the elastic element.

In some embodiments, the support body includes a base and a casing which faun a receiving space, wherein the movable portion, the elastic assembly, and the driving assembly are disposed in the receiving space, and the elastic assembly suspends the movable portion in the receiving space.

In some embodiments, the elastic assembly connects the upper shell of the casing, and there is a gap between the movable portion and the base. The casing has an opening, and the movable portion has a connecting element, wherein the connecting element passes through the opening and configured to connect the optical element. The connecting element is a connecting rod extending in a direction that is perpendicular to the extending direction of the elastic assembly. The caliber of the opening is larger than the connecting element.

In some embodiments, the elastic assembly has a sheet structure, and the elastic assembly extends toward the base. The elastic assembly has at least two elastic elements which are connected to the casing and the movable portion, and are respectively located on the first side and the second side of the movable portion. The first side is opposite the second side, and the elastic elements are parallel to each other in a first direction. The first direction is perpendicular to the extending direction.

In some embodiments, the elastic assembly includes: a first elastic element; a second elastic element; a third elastic element; and a fourth elastic element, wherein the first elastic element and the second elastic element are disposed on the first side of the movable portion, and the third elastic element and the fourth elastic element are disposed on the second side of the movable portion, wherein the first side is opposite to the second side, and the first elastic element, the second elastic element, the third elastic element and the fourth elastic element do not overlap each other in the first direction.

In some embodiments, in a second direction that is perpendicular to the extending direction, the first elastic element and the second elastic element overlap each other, wherein the second direction is different from the first direction. In a second direction that is perpendicular to the extending direction, the third elastic element and the fourth elastic element overlap each other, wherein the second direction is different from the first direction.

In some embodiments, one of the elastic elements is connected to a connecting surface of the movable portion, the connecting surface is located on the second side of the movable portion, and the connecting surface is parallel to the extending direction of the elastic assembly. Another one of the elastic elements is connected to an extended connection portion of the movable portion, and the extended connection portion is located on the first side of the movable portion, and is adjacent to the base, away from the upper shell of the casing.

In some embodiments, the driving mechanism for an optical element further comprises a position sensing element disposed between the movable portion and the base, and the driving assembly surrounds the position sensing element. The base has a recessed portion, and a sidewall of the recessed portion overlaps the movable portion when viewed from the extending direction. The movable portion has a recess located on the bottom of the movable portion, and the recess faces the base. The recess has an opening that faces the recessed portion of the base.

In some embodiments, the driving assembly has a magnetic element and a coil, and the magnetic element and the coil are arranged along the extending direction.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the optical mechanisms are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
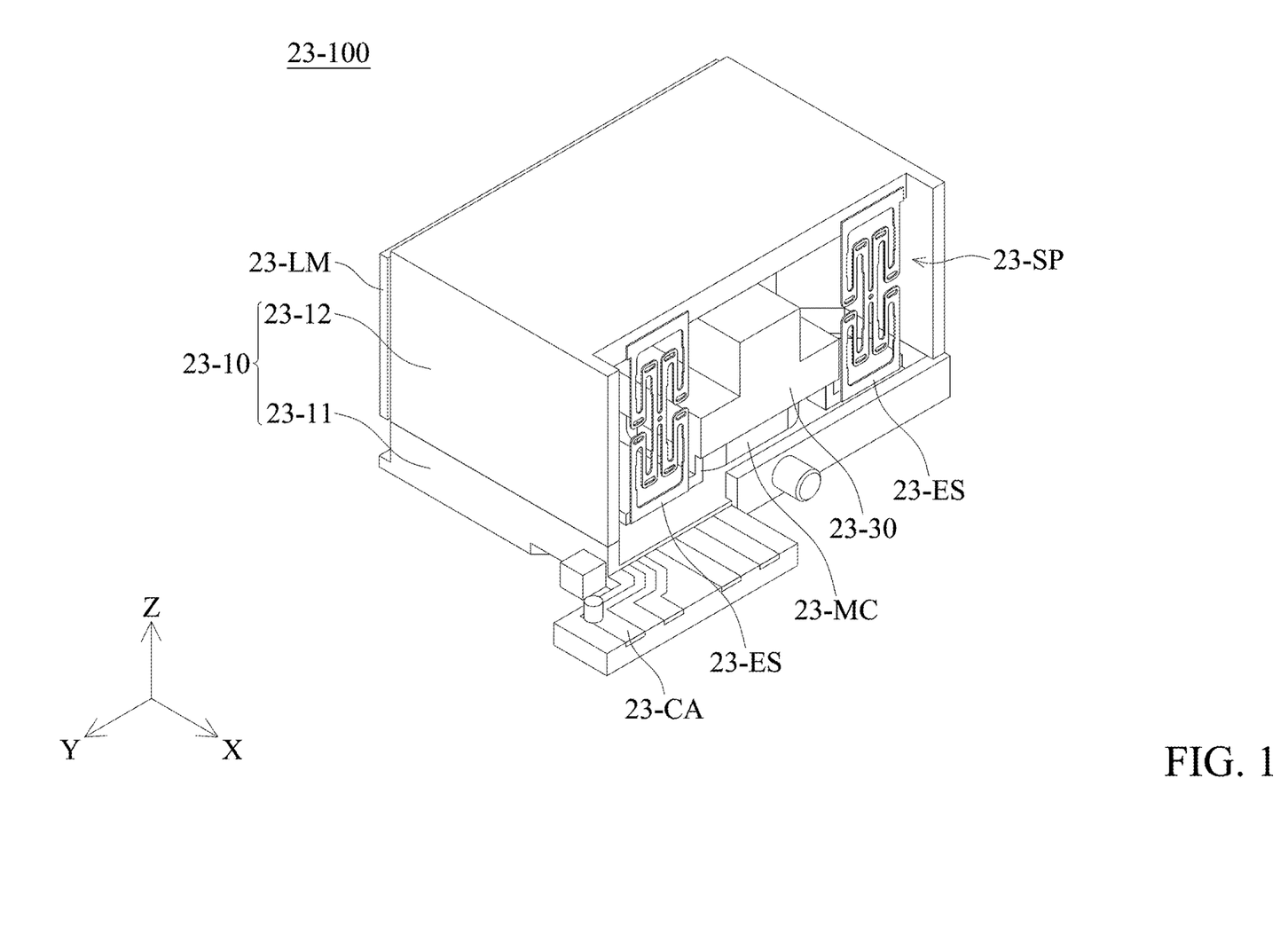
FIG. 1 is a schematic diagram showing a driving mechanism for an optical element according to an embodiment of the present invention.

Referring to FIG. 1, FIG. 1 is a schematic view showing the driving mechanism for an optical element 23-100. The driving mechanism for an optical element 23-100 can be used, for example, to drive and sustain an optical element (such as a reflector lens or mirror), and can be disposed inside a camera module of an electronic device (such as a camera, a tablet or a mobile phone). When light (incident light) from the outside enters the camera module, by the optical lens driven via the driving mechanism for an optical element 23-100, the light can be changed from the original incident direction, and the angle direction thereof can be adjusted to enter the optical lens in the camera module, and the light can pass through the optical lens to an photosensitive element (such as image sensor) to obtain an image. With the above configuration, the thickness of the camera module of the electronic device in the Z-axis direction can be greatly saved, so as to achieve miniaturization. The detailed structure of the driving mechanism for an optical element 23-100 will be described below.

Figure 2:
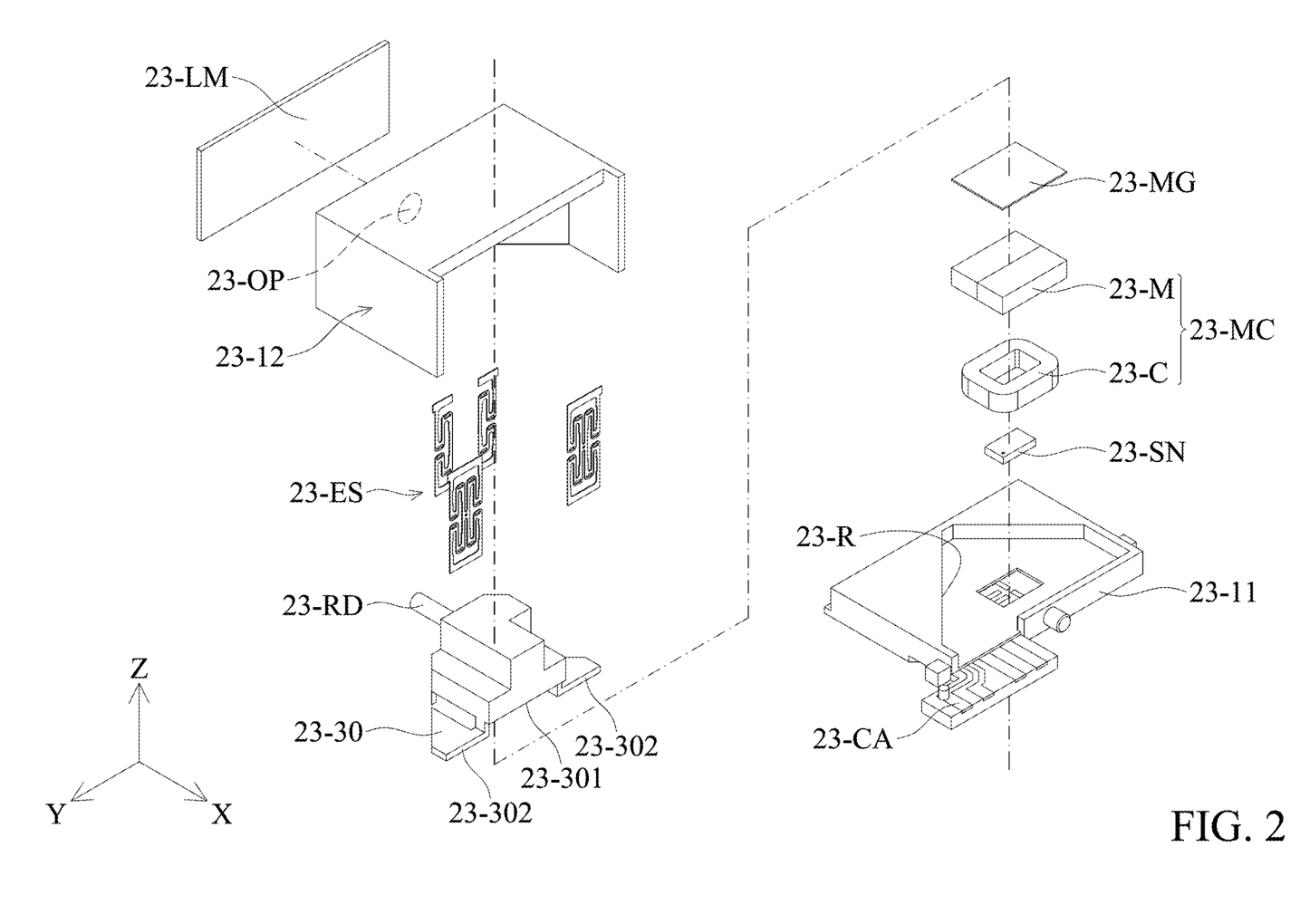
FIG. 2 is an exploded view diagram showing the driving mechanism for an optical element in FIG. 1.

Referring to FIGS. 1 and 2, wherein FIG. 2 is an exploded view of the driving mechanism for an optical element 23-100, which comprises a support body 23-10, a movable portion 23-30, a driving assembly 23-MC and an elastic assembly 23-ES. The support body 23-10 includes a base 23-11 and a casing 23-12. The casing 23-11 is connected to and disposed on the base 23-11 to form a receiving space 23-SP which is configured to accommodate receive the movable portion 23-30, the driving assembly 23-MC and the elastic assembly 23-ES for protection. A connecting element 23-RD of the movable part 23-30 can be connected to an optical element 23-LM, and the movable portion 23-30 is located over the base 23-11 and is movably connected to the casing 23-12 through the elastic assembly 23-ES. The driving assembly 23-MC is disposed between the base 23-11 and the movable portion 23-30, and is configured to drive the movable portion 23-30 relative to the base 23-11 and the casing 23-12 to move, to adjust the position of the optical element, thereby achieving the purpose of optical autofocusing (AF) or optical image stabilization (OIS). In some embodiments, the connecting element 23-RD is a connecting rod extending along a direction (X-axis) that is perpendicular to the extending direction (Z-axis) of the elastic component 23-ES.

Figure 3:
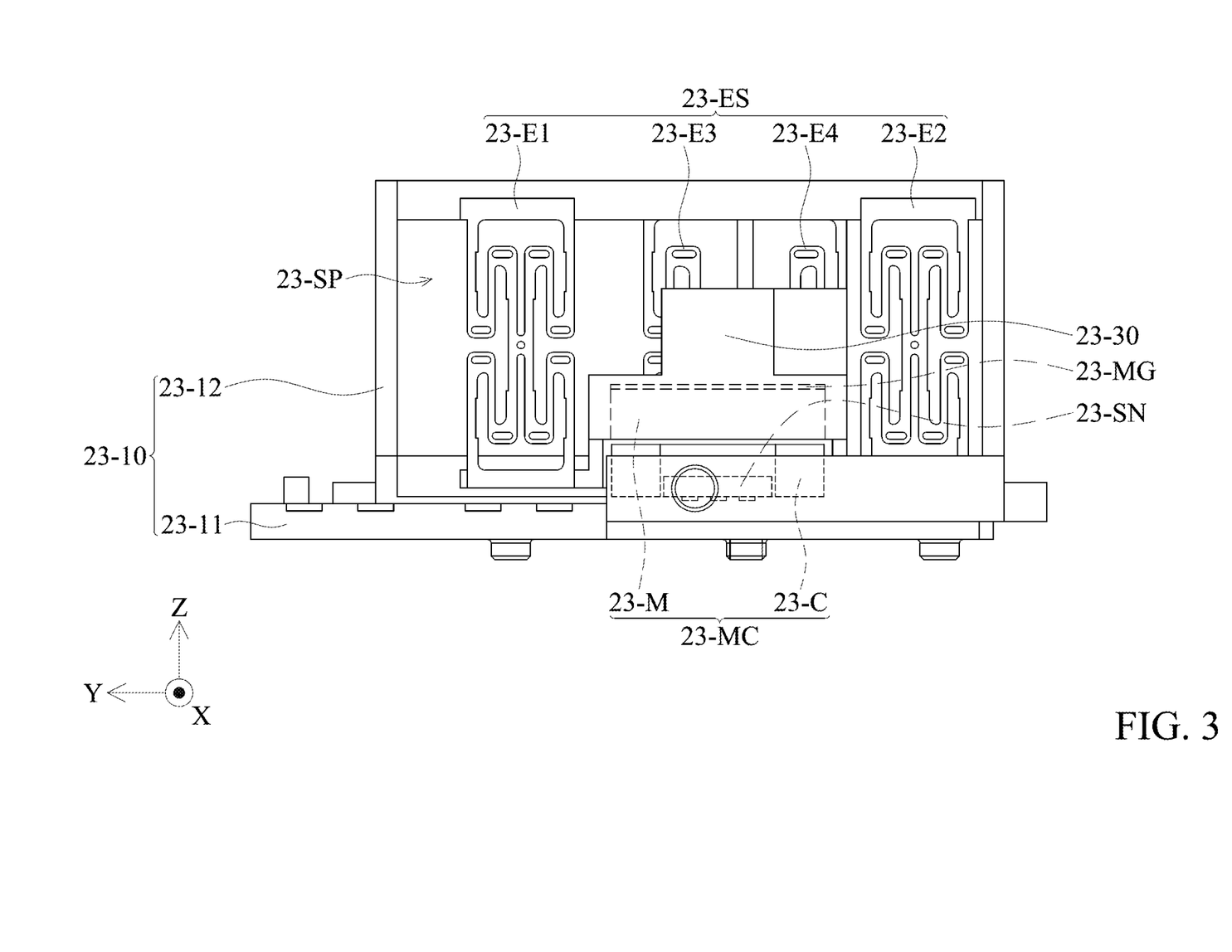
FIG. 3 is a front view diagram of the driving mechanism in FIG. 1.
Figure 4:
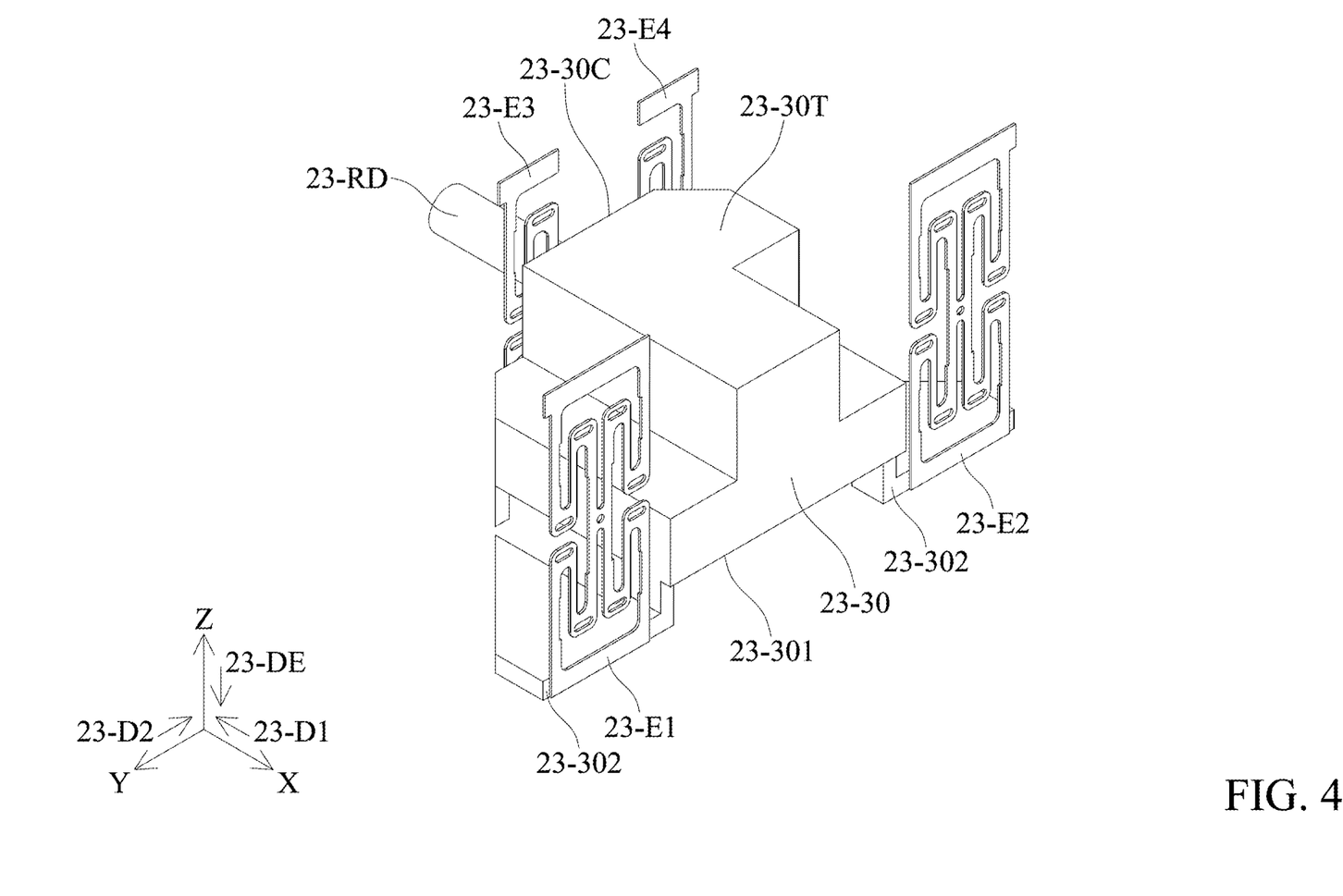
FIG. 4 is a schematic diagram of the movable portion and the elastic assembly.
Figure 5A:
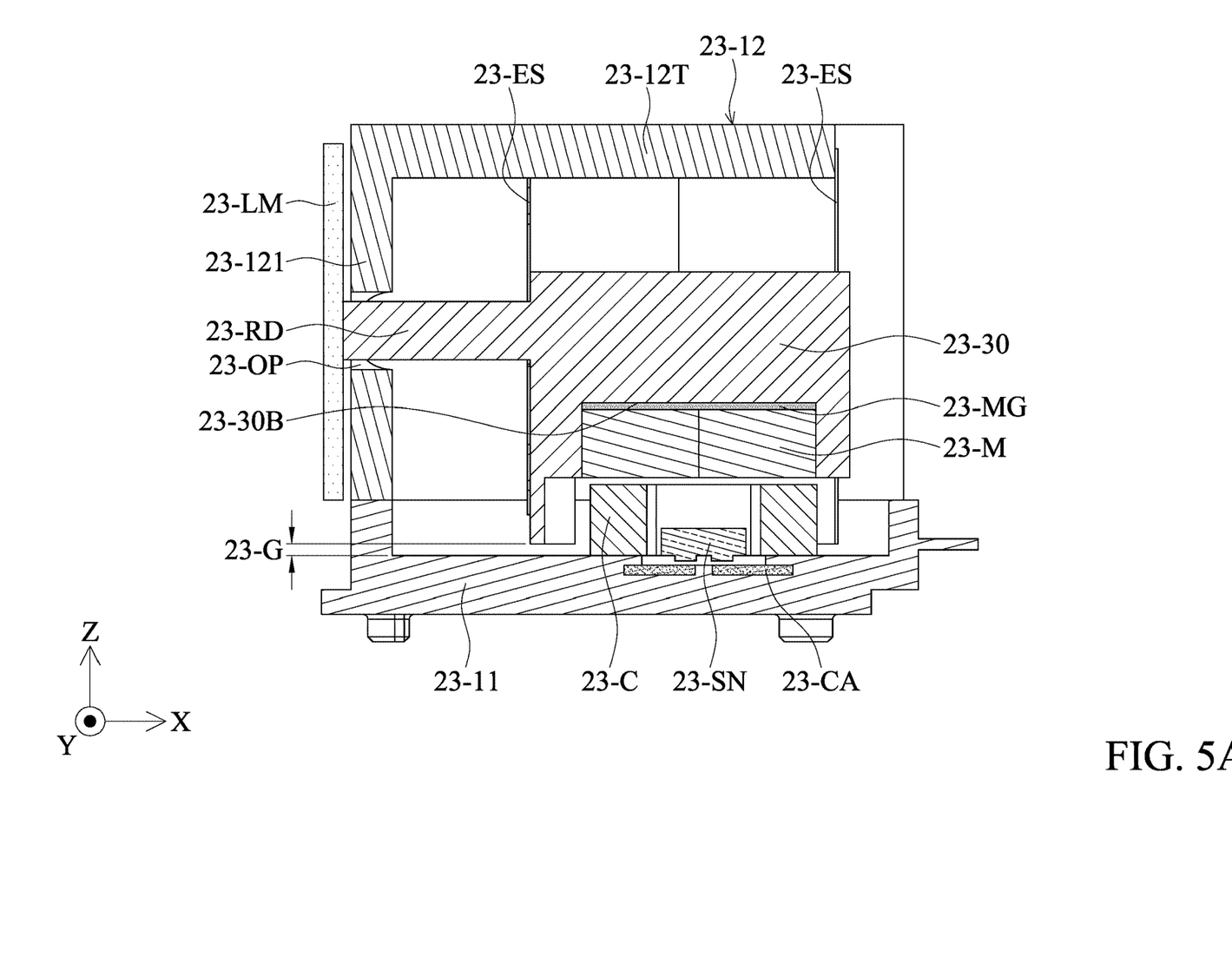
FIGS. 5A and 5B are schematic diagrams of the movable portion and the optical element driven by the driving assembly.

Referring to FIGS. 3 and 4, in this embodiment, the elastic assembly 23-ES has four elastic elements: a first elastic element 23-E1, a second elastic element 23-E2, a third elastic element 23-E3 and a fourth elastic element 23-E4. Each elastic element has a sheet structure and can be a leaf spring. The first elastic element 23-E1 and the second elastic element 23-E2 are disposed on the front side of the movable portion 23-30 (the first side 23-30S1), and the second elastic element 23-E3 and the fourth elastic element 23-E4 are disposed on the rear side of the moving part 23-30 (the second side 23-30S2). The first to fourth elastic elements 23-E1 to 23-E4 connect the upper side of the casing 23-12 (or its upper shell 23-12T) and the movable portion 23-30, so that the movable portion 23-30 is suspended from the casing 23-12 and is suspended in the receiving space 23-SP, and there is a gap 23-G between the movable portion 23-30 and the upper surface of the base 23-11 (FIG. 5A). The first elastic element 23-E1, the second elastic element 23-E2, the third elastic element 23-E3 and the fourth elastic element 23-E4 do not overlap each other when viewed from the direction in which the connecting element 23-RD (X-axis) extends.

The extending direction 23-DE (Z-axis) of the elastic elements 23-E1 to 23-E4 are toward the base 23-11, the first and second elastic elements 23-E1, 23-E2, and the third and fourth elastic elements 23-E3, 23-E4 are arranged in parallel in a first direction 23-D1 (X-axis), and the first and second elastic elements 23-E1 and 23-E2 are at different positions in a second direction 23-D2 (Y-axis) direction, and the third and fourth elastic elements 23-E3, 23-E4 are at different positions in the second direction 23-D2 (Y-axis) direction, wherein the second direction 23-D2 is perpendicular to the first direction 23-D1.

The movable portion 23-30 has an extended connection portion 23-302 which is adjacent to the base 23-11 and away from the upper shell 23-12T of the casing 23-12. The first and second elastic elements 23-E1 and 23-E2 are connected to the extended connection portion 23-302 and the upper shell 23-12T of the casing 23-12. The third and fourth elastic elements 23-E3 and 23-E4 connect a connecting surface 23-30C of the movable portion 23-30 on the second side 20-30S2 with the upper shell 23-12T. Seen from the first direction 23-D1, the first to fourth elastic elements 23-E1 to 23-E4 do not overlap each other. In some embodiments, in the first direction 23-D2, the first and second elastic elements 23-E1, 23-E2 overlap each other, and the third and fourth elastic elements 23-E3, 23-E4 overlap each other. The above-mentioned configuration helps to stabilize the movable portion 23-30 to be suspended inside the casing 23-12. In addition, in some embodiments, the base 23-11 has a recessed portion 23-R. Seen from the extension direction 23-DE, the movable portion 23-30 is located above the recessed portion 23-R. Seen from the first or second direction 23-D1, 23-D2, the sidewall of the recessed portion 23-R overlaps the movable portion 23-30, which helps to limit the movement of the movable portion 23-30 to avoid causing excessive shaking.

The connecting element 23-RD of the aforementioned movable portions 23-30 extends along the first direction 23-D1 (X-axis) to connect the optical element 23-LM, and the connecting element 23-RD is perpendicular to the extending direction DE (Z-axis) of each of elastic elements 23-E1 to 23-E4. The connecting element 23-RD is connected to the optical element 23-LM through an opening 23-OP of the casing 23-12. The opening 23-OP has a larger diameter or a caliber than the connecting element 23-RD. Now referring to FIG. 5A, the opening 23-OP is on the sidewall 23-121 of the casing 23-12, wherein the connecting element 23-RD passes through the opening 23-OP. The distance between the optical element 23-LM and the sidewall 23-121 of the casing 23-12 is smaller than the distance between the optical element 23-LM and the upper shell 23-12T of the casing 23-12. The optical element 23-LM is completely on the outside of the receiving space formed by the base 23-11 and the casing 23-12.

Referring to FIGS. 4 and 5A, the bottom of the movable portion 23-30 has a recess (or groove) 23-301, and the opening of the recess 23-301 faces the base 23-11 and faces the recessed portion 23-R of the base 23-11. The aforementioned driving assembly 23-MC is disposed in the recess 23-301. In detail, the driving assembly 23-MC may be an electromagnetic driving assembly, which includes a magnetic element 23-M and a coil 23-C, which are respectively disposed on the bottom surface 23-30B of the movable portion 23-30 and base 23-11 and arranged along the extension direction 24-DE. The magnetic element 23-M and the coil 23-C correspond to each other. When a driving signal is applied to the driving component 23-MC (for example, by applying an electric current through an external power source), a magnetic force is generated between the magnetic element 23-M and the coil 23-C, thereby driving the movable portion 23-30 to move relative the support body 23-10 (including base 23-11 and casing 23-12), to achieve the effect of anti-shake or auto-focus of optical image. In this embodiment, the driving assembly 23-MC is a moving magnetic type; in another embodiment, it may be a moving coil type. In addition, before the driving signal is applied, the aforementioned elastic component 23-ES can keep the movable portion in an initial position relative to the support body 23-10. The casing 23-12 includes the upper shell 23-12T and a sidewall 23-121. The upper shell 23-12T is parallel to the base 23-11, and the upper shell 23-12T is perpendicular to the sidewall 23-121. The connecting element 23-RD extends toward the sidewall 23-121 of the casing 23-12. The optical element 23-LM is adjacent to the sidewall 23-121 of the casing 23-12. The optical element 23-LM is on the outside of the receiving space formed by the base 23-11 and the casing 23-12.

In this embodiment, the driving mechanism 23-100 includes a permeability element 23-GM disposed between the movable portion 23-30 and the driving assembly 23-MC. In detail, it is located between the bottom surface 23-30B and the magnetic element 23-M, so that the magnetic force of the magnetic element 23-M can be concentrated in a predetermined direction to enhance the magnetic force of the driving assembly 23-MC to drive the movable portion 23-30, and the magnetic interference can be decreased. In another embodiment, the permeability element 23-GM can be embedded in a part of the bottom surface 23-30B of the movable portion 23-30 which is corresponding to the magnetic element 23-M, so that the movable portion 23-30 includes permeability conductive material, and the magnetic element 23-M can be directly contacted and fixed on the bottom surface 23-30B. In addition to strengthening the magnetic force (between the magnetic element 23-M and the coil 23-C) in a predetermined direction, it can also strengthen the overall mechanical strength of the movable portion 23-30.

The driving mechanism 23-100 includes a position sensing element 23-EN, which may be a position sensor, for example, a magnetoresistive sensor (MRS) or optical sensor, which is used to sense the relative positional relationship between the movable portion 23-30 and the base 23-11, which facilitates a control unit (not shown) to adjust the positions between the two by the driving assembly 23-MC. It is worth noting that the position sensing element 23-EN is provided in the hollow portion of the coil 23-C, or that the position sensing element 23-EN is surrounded by the coil 23-C. This configuration can make full use of space and is good for miniaturization. In this embodiment, the position sensing element 23-EN can share the magnetic element 23-M with the coil 23-C.

A circuit component 23-CA is disposed on the base 23-11, and is used to electrically connect the driving assembly 23-MC and the position sensing element 23-EN. In this embodiment, the circuit assembly 23-CA is formed by insert molding on the body of the base 23-11. In another embodiment, the base 23-11 may include a circuit board component, such as a printed circuit board (PCB), which is disposed on the body of the base 23-11 and is electrically connected to the driving assembly 23-MC and position sensing element 23-EN.

Figure 5B:
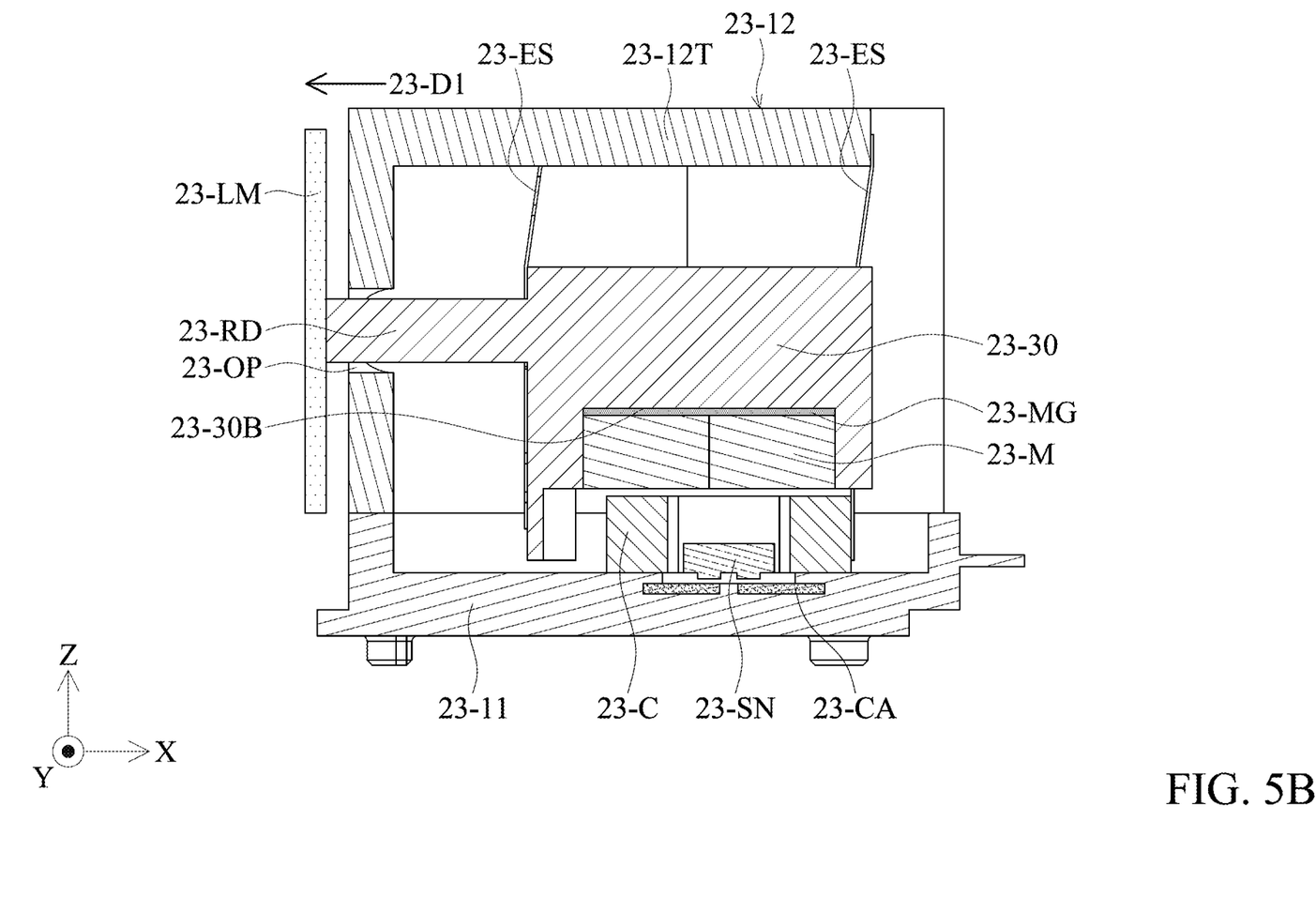

Referring to FIGS. 5A and 5B, when the driving assembly 23-MC drives the movable portion 23-30 to move relative to the support body 23-10, the connecting element 23-RD of the movable portion 30 also drives the optical element 23-LM to move relative to the support body 23-10. FIG. 5B shows that the movable portion 23-30 moves in the first direction 23-D1 (X-axis) relative to the support body 10, and drives the optical element 23-LM to move in the first direction 23-D1. Through the magnetic element 23-M and the coil 23-C of the driving assembly 23-MC, the movable portion 23-30 (with the optical element 23-LM together) can also be moved in the second direction 30-D2. That is, the driving unit 23-MC can move the movable portion 23-30 and the optical element 23-LM relative to the support body 23-10 on the XY plane.

In this way, the movable portion 23-30 is suspended through the elastic assembly 23-ES so that it can be movably set over the base 23-11, and the movable portion 23-30 is driven by the drive assembly 23-MC to move relative to the support body 23-10, so that the optical element 23-LM moves together. By adjusting the incident angle of the reflected light from the optical element 23-LM into the optical lens, it can achieve the effects of optical focusing or optical image stabilization.

It should be noted that, with respect to the aforementioned elastic assembly 23-ES, in some embodiments, one elastic element may be provided on each of the first side 23-30S1 and the second side 23-30S2 of the movable portion 23-30. For example, providing the first elastic element 23-E1 and the first elastic element 23-E4, can also hang the movable portion 23-30 on the casing 23-12. In other embodiments, the elastic assembly 23-ES may also include only one elastic element, which connects the upper shell 23-12T of the casing 23-12 and the top surface 23-30T of the movable portion 23-30 to suspend it in receiving space 23-SP.

In summary, an embodiment of the present invention provides a driving mechanism for an optical element, including a support body, a movable portion, an elastic assembly, and a driving assembly. The movable portion is located in the support body and is movable relative to the support body, and is used to connect an optical element. The elastic assembly is movably connected to the support body and the movable portion. The driving assembly is disposed on the support body and the movable portion, and is configured to drive the movable portion to move relative to the support body. In some embodiments, the movable portion is suspended in the support body through the elastic element, and when the movable portion is driven by the driving assembly to move relative to the support body, the movable portion is configured to drive the optical element to move. The support body includes a base and a casing, the casing is connected to and disposed on the base, the elastic assembly movably connects the casing and the movable portion, and the driving assembly is disposed between the base and the movable portion, and the movable portion is suspended from the casing through the elastic element.

The embodiment of the present invention has at least one of the following advantages or effects, in that the movable portion is suspended from the casing by an elastic assembly so that it is disposed on the base in a movable manner, and the movable portion is driven to move with the optical element together relative to the base by the driving assembly, to adjust the incident angle of the light reflected by the optical element into the optical lens, the effects of optical focusing and optical image stabilization can be achieved. By suspending the movable portion through the elastic assembly, as compared with setting a suspension movable frame, the embodiment of the present invention can greatly reduce the space occupied by the suspension component inside the driving mechanism, and is conducive to miniaturization. Furthermore, due to the lightness and flexibility of the elastic assembly, the sensitivity and accuracy of the movable portion can be improved when it is moving, thereby increasing the accuracy of moving the optical element.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. A driving mechanism for an optical element, comprising:
   a support body;
   a movable portion, located in the support body, movable relative to the support body, and configured to connect to an optical element;
   an elastic assembly, movably connected to the support body and the movable portion; and
   a driving assembly, disposed on the support body and the movable portion, and configured to drive the movable portion to move relative to the support body;
   wherein the support body comprises a base and a casing which form a receiving space, wherein the movable portion, the elastic assembly, and the driving assembly are disposed in the receiving space, and the elastic assembly suspends the movable portion in the receiving space;
   wherein the elastic assembly has a sheet structure, and an extending direction of the elastic assembly is toward the base;
   wherein the elastic assembly movably connects the casing and the movable portion;
   wherein the casing comprises an upper shell and a sidewall, wherein the upper shell is parallel to the base, and the upper shell is perpendicular to the sidewall;
   wherein the movable portion comprises a connecting element configured to connect the optical element, wherein the connecting element extends toward the sidewall of the casing;
   wherein the casing further comprises an opening on the sidewall of the casing, wherein the connecting element passes through the opening.

2. The driving mechanism for an optical element as claimed in claim 1, wherein when the movable portion is driven by the driving assembly to move relative to the support body, the movable portion is configured to drive the optical element to move.

3. The driving mechanism for an optical element as claimed in claim 1, wherein the casing is connected to and disposed on the base, and the driving assembly is disposed between the base and the movable portion, and the movable portion is suspended from the casing through the elastic assembly.

4. The driving mechanism for an optical element as claimed in claim 1, wherein the elastic assembly connects the upper shell of the casing, and there is a gap between the movable portion and the base.

5. The driving mechanism for an optical element as claimed in claim 1, wherein the connecting element is a connecting rod extending in a direction that is perpendicular to an extending direction of the elastic assembly.

6. The driving mechanism for an optical element as claimed in claim 1, wherein a caliber of the opening is larger than the connecting element.

7. The driving mechanism for an optical element as claimed in claim 1, wherein the elastic assembly has at least two elastic elements which are connected to the casing and the movable portion, and are respectively located on a first side and a second side of the movable portion, the first side is opposite to the second side, and the elastic elements are parallel to each other in a first direction, wherein the first direction is perpendicular to the extending direction.

8. The driving mechanism for an optical element as claimed in claim 1, wherein the elastic assembly includes:
   a first elastic element;
   a second elastic element;
   a third elastic element; and
   a fourth elastic element, wherein the first elastic element and the second elastic element are disposed on a first side of the movable portion, and the third elastic element and the fourth elastic element are disposed on a second side of the movable portion, wherein the first side is opposite to the second side, and the first elastic element, the second elastic element, the third elastic element and the fourth elastic element do not overlap each other in a first direction, wherein the first direction is perpendicular to the extending direction, and the first elastic element, the second elastic element, the third elastic element and the fourth elastic element do not overlap each other when viewed from a direction in which the connecting element extends.

9. The driving mechanism for an optical element as claimed in claim 8, wherein in a second direction that is perpendicular to the extending direction, the first elastic element and the second elastic element overlap each other, wherein the second direction is different from the first direction.

10. The driving mechanism for an optical element as claimed in claim 8, wherein in a second direction that is perpendicular to the extending direction, the third elastic element and the fourth elastic element overlap each other, wherein the second direction is different from the first direction.

11. The driving mechanism for an optical element as claimed in claim 7, wherein one of the elastic elements is connected to a connecting surface of the movable portion, the connecting surface is located on the second side of the movable portion, and the connecting surface is parallel to the extending direction of the elastic assembly.

12. The driving mechanism for an optical element as claimed in claim 11, wherein another one of the elastic elements is connected to an extended connection portion of the movable portion, and the extended connection portion is located on the first side of the movable portion, and is adjacent to the base and away from the upper shell of the casing.

13. The driving mechanism for an optical element as claimed in claim 3, further comprising a position sensing element disposed between the movable portion and the base, and the driving assembly surrounds the position sensing element.

14. The driving mechanism for an optical element as claimed in claim 1, wherein the base has a recessed portion, and a sidewall of the recessed portion overlaps the movable portion when viewed from the extending direction.

15. The driving mechanism for an optical element as claimed in claim 14, wherein the movable portion has a recess located on a bottom of the movable portion, and the recess faces the base.

16. The driving mechanism for an optical element as claimed in claim 15, wherein an opening of the recess faces the recessed portion of the base.

17. The driving mechanism for an optical element as claimed in claim 1, wherein the driving assembly has a magnetic element and a coil, and the magnetic element and the coil are arranged along the extending direction.

18. A driving mechanism for an optical element, comprising:
   a support body;
   a movable portion, located in the support body, movable relative to the support body, and configured to connect to an optical element;
   an elastic assembly, movably connected to the support body and the movable portion; and
   a driving assembly, disposed on the support body and the movable portion, and configured to drive the movable portion to move relative to the support body;
   wherein the support body comprises a base and a casing which form a receiving space, wherein the movable portion, the elastic assembly, and the driving assembly are disposed in the receiving space, and the elastic assembly suspends the movable portion in the receiving space;
   wherein the casing comprises an upper shell and a sidewall, the upper shell is parallel to the base, the upper shell is perpendicular to the sidewall, and the optical element is adjacent to the sidewall of the casing;
   wherein a distance between the optical element and the sidewall of the casing is smaller than a distance between the optical element and the upper shell of the casing;
   wherein the optical element is completely on the outside of the receiving space formed by the base and the casing.

19. A driving mechanism for an optical element, comprising:
   a support body;
   a movable portion, located in the support body, movable relative to the support body, and configured to connect to an optical element;
   an elastic assembly, movably connected to the support body and the movable portion; and
   a driving assembly, disposed on the support body and the movable portion, and configured to drive the movable portion to move relative to the support body;
   wherein the support body comprises a base and a casing which form a receiving space, wherein the movable portion, the elastic assembly, and the driving assembly are disposed in the receiving space, and the elastic assembly suspends the movable portion in the receiving space;
   wherein the optical element is completely on the outside of the receiving space formed by the base and the casing.

20. A driving mechanism for an optical element, comprising:
   a support body;
   a movable portion, located in the support body, movable relative to the support body, and configured to connect to an optical element;
   an elastic assembly, movably connected to the support body and the movable portion; and
   a driving assembly, disposed on the support body and the movable portion, and configured to drive the movable portion to move relative to the support body;
   wherein the movable portion has a recess located on a bottom of the movable portion, and the driving assembly is disposed in the recess;
   wherein the support body comprises a base and a casing which form a receiving space, wherein the movable portion, the elastic assembly, and the driving assembly are disposed in the receiving space, and the elastic assembly suspends the movable portion in the receiving space;
   wherein the optical element is completely on the outside of the receiving space formed by the base and the casing.

* * * * *